(12) United States Patent
Greason et al.

(10) Patent No.: US 7,784,268 B1
(45) Date of Patent: Aug. 31, 2010

(54) PARTIAL SUPERHEAT CYCLE FOR OPERATING A PUMP IN A ROCKET SYSTEM

(75) Inventors: Jeffrey K. Greason, Tehachapi, CA (US); Daniel L. DeLong, Mojave, CA (US); Douglas B. Jones, Mojave, CA (US)

(73) Assignee: XCOR Aerospace, Mojave, CA (US)

( * ) Notice: Subject to any disclaimer, the term of this patent is extended or adjusted under 35 U.S.C. 154(b) by 1030 days.

(21) Appl. No.: 11/499,087

(22) Filed: Aug. 4, 2006

(51) Int. Cl.
*F02K 9/00* (2006.01)
(52) U.S. Cl. .............................. 60/259; 60/260; 60/267
(58) Field of Classification Search .................... 60/257, 60/258, 259, 266, 267, 260
See application file for complete search history.

(56) References Cited

U.S. PATENT DOCUMENTS

| | | | | |
|---|---|---|---|---|
| 3,882,676 A * | 5/1975 | Schmidt | ...................... | 60/245 |
| 4,160,629 A * | 7/1979 | Hidden et al. | .............. | 418/55.3 |
| 4,583,362 A * | 4/1986 | Wagner | ........................ | 60/259 |
| 4,589,253 A * | 5/1986 | Wagner | ........................ | 60/259 |
| 4,894,986 A * | 1/1990 | Etheridge | ..................... | 60/259 |
| 5,410,874 A * | 5/1995 | Limerick | ..................... | 60/259 |
| 5,640,844 A * | 6/1997 | Pahl | ............................ | 60/259 |
| 6,185,944 B1 * | 2/2001 | Gaul | ........................... | 62/115 |

* cited by examiner

*Primary Examiner*—Ted Kim
(74) *Attorney, Agent, or Firm*—Christie, Parker & Hale, LLP.

(57) ABSTRACT

A system and method of driving a fuel pump and/or an oxidizer pump in a propulsion system includes pumping an oxidizer from an oxidizer supply to a rocket engine with the oxidizer pump. A first portion of the pumped oxidizer is used for combustion in the rocket engine. The heat from the combustion of the first portion of the oxidizer is then transferred to a second portion of the pumped oxidizer to convert the second portion of the oxidizer to a super-heated gaseous oxidizer. The super-heated gaseous oxidizer operates a motor, which drives the oxidizer pump and/or the fuel pump.

30 Claims, 3 Drawing Sheets

PARTIAL SUPERHEAT CYCLE FOR OPERATING A PUMP IN A ROCKET SYSTEM

FIELD OF THE DISCLOSURE

The present disclosure generally relates to rocket engines, and more particularly, to a system and method for operating a pump in a rocket engine.

BACKGROUND

Liquid rocket engines operate at high pressure in order to force the fuel and oxidizer into the combustion chamber. To supply such a pressure to the fuel and the oxidizer, some rocket engines use fuel and oxidizer tanks pressurized to a pressure sufficient to force propellant into the rocket combustion chamber. In such engines, however, the pressurization system and tank mass significantly adds to the mass of the rocket system. Certain rocket engines do not use a pressure-fed system and instead use one or more pumps to supply fuel and oxidizer to the combustion chamber. Such pump-fed engines require a source of energy to drive the pump or pumps.

Several methods are known for driving one or more pumps for pressurization of fuel and oxidizer. In one method that is used in a gas generator type of system, a portion of the propellant at the output of the pump, or an auxiliary monopropellant, is burned to produce hot gas. The hot gas drives a turbine or a gas motor to provide mechanical power for the pump. The resulting exhaust from that motor is then ejected overboard. In these systems, some loss of performance occurs as that propellant that is burned in the gas generator is not available to produce thrust. In another known method called an expander cycle, which is used in liquid oxygen/hydrogen engines, the fuel that comes out of the pump is used to cool the rocket engine. The fuel is thereby heated and turns into gas, which is then used to drive the motor to provide power to the pump. The pump is operated at such a high pressure that the pressure of the output exhaust from the motor is high enough to be injected into the rocket engine and burned as fuel. The expander cycle works well with liquid hydrogen, because liquid hydrogen has a comparatively small heat of vaporization and a boiling point of around 20 degrees Kelvin. Accordingly, liquid hydrogen can absorb a large amount of heat when in the gaseous state. Therefore, hydrogen can be significantly superheated even though all of it flows through the engine or engine walls as coolant.

Such an expander cycle, however, may not be possible for other propellant combinations. For example, when kerosene is used as a fuel and oxygen as an oxidizer, kerosene cannot be evaporated because doing so would raise its temperature to the point where it undergoes undesirable chemical changes, breaks down or leaves deposits in the engine. In such cases, even though the kerosene can be used as a coolant, it becomes impractical to use as a working fluid to transfer energy to the motor for purposes of driving the pump.

Therefore, there is a need for an efficient propulsion system and method that is capable of adapting to a variety of propellant combinations.

SUMMARY

In accordance with one aspect of the present disclosure, a propulsion system includes a rocket engine having a combustion chamber and at least one heat exchanger between the heat of combustion generated by the combustion chamber and a portion of the oxidizer flow, an oxidizer supply, an oxidizer pump configured to fluidically couple the oxidizer supply to the combustion chamber and to the heat exchanger, and a motor disposed downstream of the heat exchanger. An inlet of the motor is fluidically coupled to the heat exchanger. The motor is configured to drive the oxidizer pump.

In accordance with another aspect of the present disclosure, a method of driving any one of a fuel pump and an oxidizer pump in a propulsion system includes pumping an oxidizer from an oxidizer supply to a rocket engine with the oxidizer pump, combusting a first portion of the oxidizer in the rocket engine, transferring heat from the combustion of the first portion of the oxidizer to a second portion of the pumped oxidizer to convert the second portion of the oxidizer to a super-heated gaseous oxidizer, operating a motor with the super-heated gaseous oxidizer, and driving the oxidizer pump with the motor, the motor exhaust being cooled by heat exchange with the oxidizer flow and then being returned to the oxidizer supply.

In accordance with another aspect of the present disclosure, a method of operating an oxidizer pump in a propulsion system having an oxidizer supply and a rocket engine includes heating a portion of an oxidizer in the oxidizer supply by a heat of combustion from the rocket engine, the heating converting the oxidizer into a super-heated gaseous oxidizer, operating a motor with the super-heated gaseous oxidizer, and driving the oxidizer pump with the motor, the motor exhaust then being combined with the oxidizer flowing to the rocket engine by means of a jet pump.

DETAILED DESCRIPTION

Figure 1:
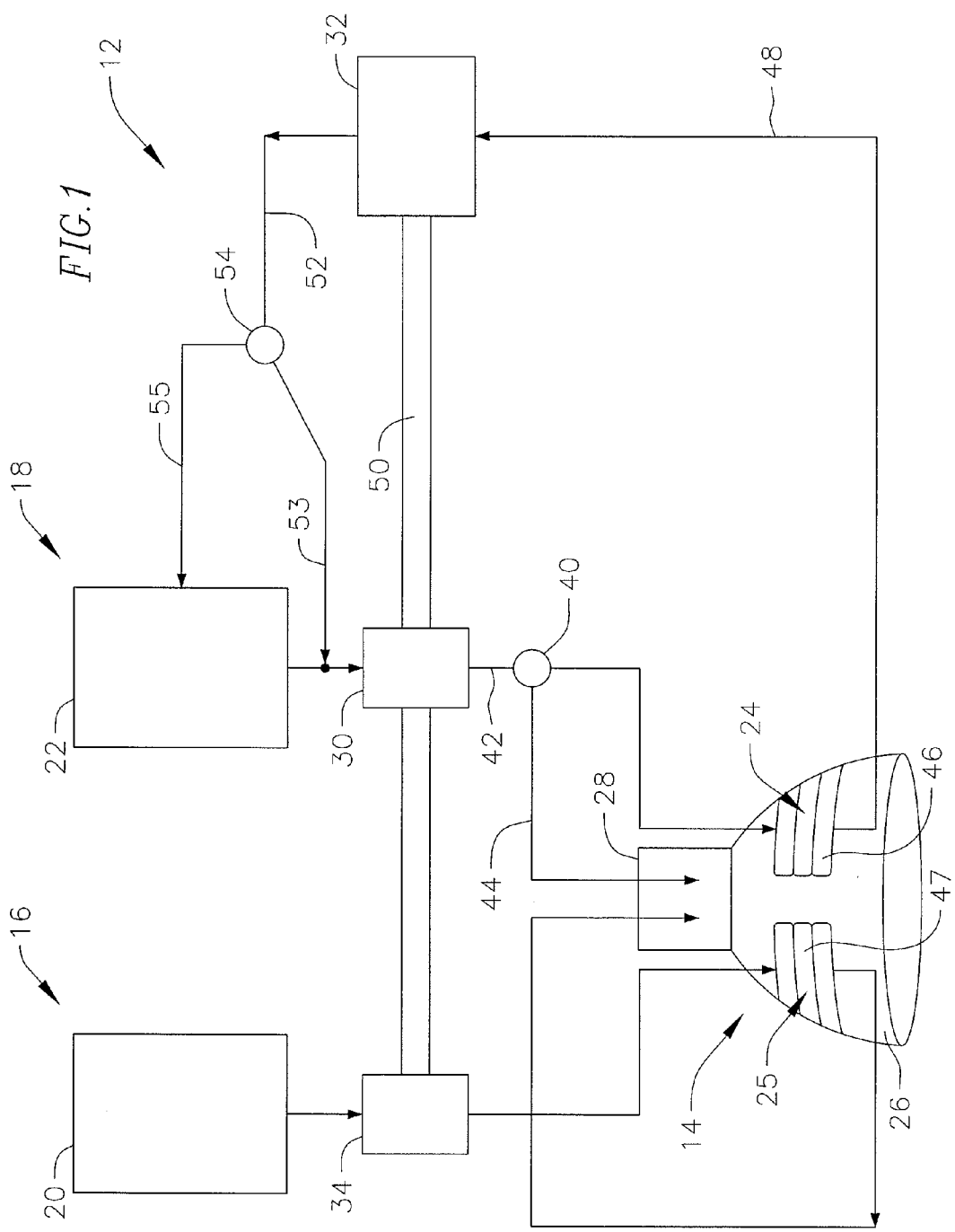
FIG. 1. is a schematic diagram of a system for operating a propellant pump in a rocket engine in accordance with one embodiment of the present disclosure.
Figure 2:
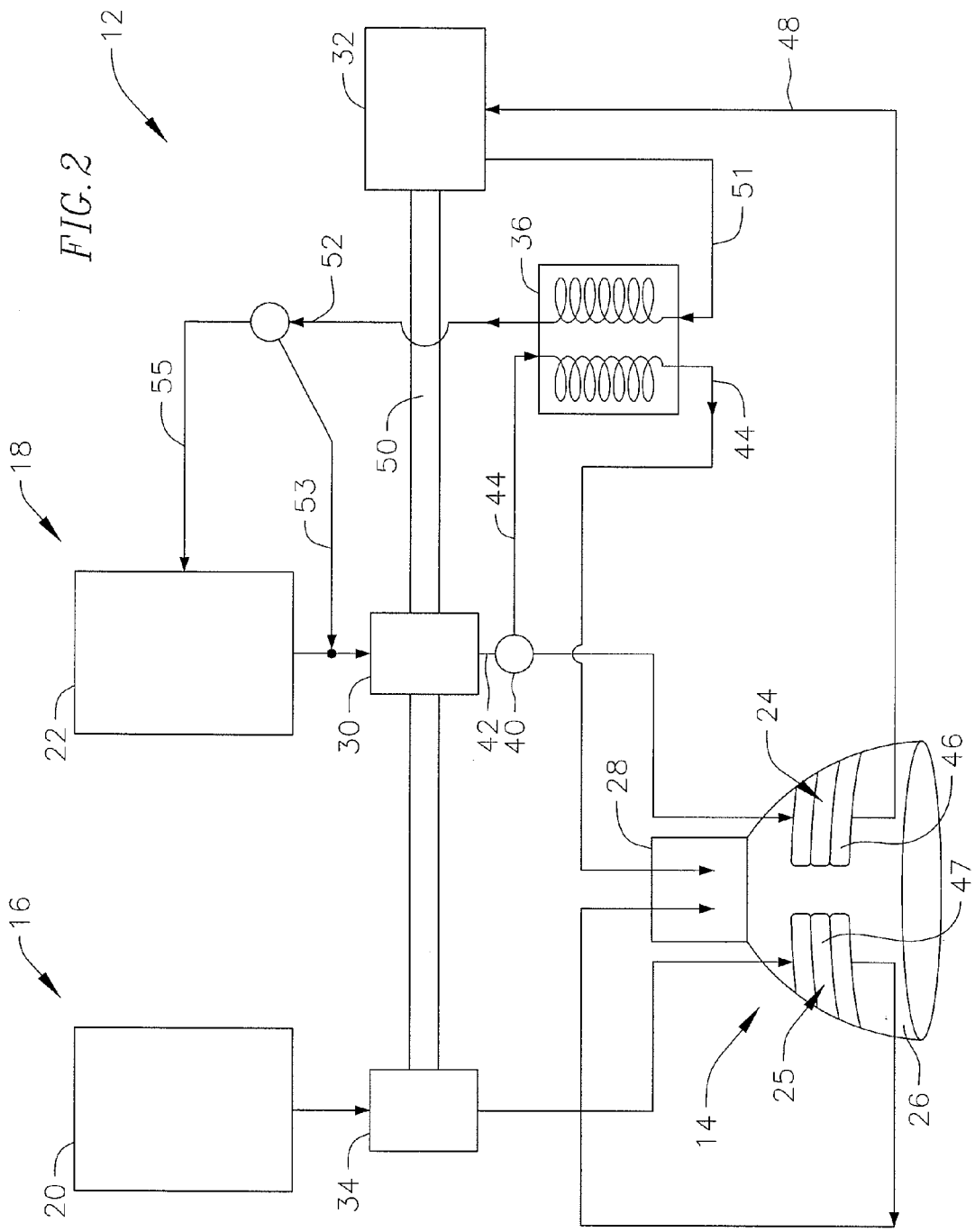
FIG. 2. is a schematic diagram of a system for operating a propellant pump in a rocket engine in accordance with another embodiment of the present disclosure.
Figure 3:
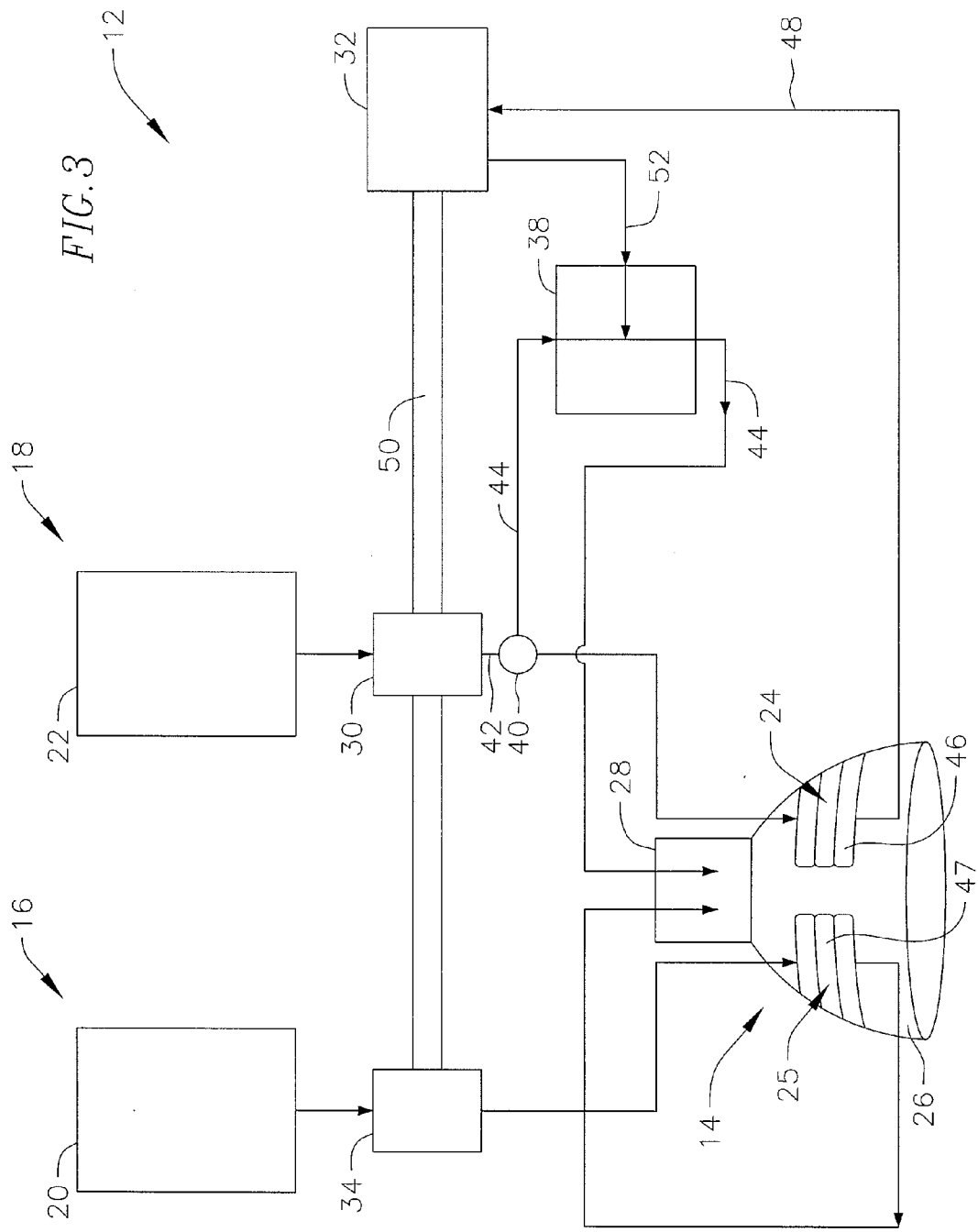
FIG. 3. is a schematic diagram of a system for operating a propellant pump in a rocket engine in accordance with another embodiment of the present disclosure.

Referring to FIGS. 1-3, in which like parts are denoted with like reference numbers, a system 10 and method for operating a fuel and/or oxidizer pump for a propulsion system 12. The propulsion system 12 includes a rocket engine 14. The propulsion system 12 further includes a fuel supply 16 and an oxidizer supply 18, both of which can be in fluid and/or gaseous communication with the rocket engine 14 to supply fuel, such as kerosene, methane, or any other liquid fuel, and oxidizer such as oxygen, respectively, to the rocket engine 14. The fuel supply 16 may be in the form of a fuel stored in a fuel tank 20, and the oxidizer supply 18 may be in the form of an oxidizer stored in an oxidizer tank 22. The rocket engine 14 includes a heat exchanger 24, which may be an integral part of a nozzle 26 and/or a combustion chamber 28. The propulsion system 12 includes an oxidizer pump 30, which is operated by a motor 32, to supply the oxidizer from the oxidizer tank 22 to the combustion chamber 28. A portion of the oxidizer that is supplied to the rocket engine 14 is diverted to the heat exchanger 24, in which the oxidizer is heated to a super-heated state. The super-heated oxidizer is then used to operate the motor 32. Additionally, the motor 32 may be used to operate a fuel pump 34 to supply fuel to the combustion chamber 28.

In one embodiment of the present disclosure, as shown in FIG. 1, the portion of the oxidizer that is used to operate the motor 32 is placed back in the oxidizer supply 18. In a second embodiment of the present disclosure, as shown in FIG. 2, the portion of the oxidizer that is used to operate the motor 32 is cooled by transferring heat to the portion of the oxidizer that is bound for combustion in the combustion chamber 28. The transfer is facilitated by a heat exchanger 36. The cooled oxidizer is then placed back in the oxidizer supply 18. In a third embodiment of the present disclosure, as shown in FIG. 3, the oxidizer is combined with the portion of the oxidizer that is bound for the combustion chamber 28 by using a jet pump 38. The system and method of the present disclosure provides for operating any one of the fuel pump 34 and the oxidizer pump 30 with the super-heated oxidizer.

Referring to FIG. 1, in which the system 10 and method in accordance with the first embodiment of the present disclosure is shown, the oxidizer from the oxidizer tank 22, or generally from an oxidizer supply 18 is pressurized by the oxidizer pump 30. Downstream of the oxidizer pump 30, the system 10 of the present disclosure includes a flow coupling device 40, which may be a throttling valve, a tee with control orifices, or any suitable passive or active control device, that can split the oxidizer in the conduit 42 into two portions. The conduit 42 may be any type of conduit, pipe, flow mechanism, or other suitable fluid and/or gaseous flow device. A first portion of the oxidizer, which includes a larger portion of the oxidizer, is supplied with a conduit 44 to the combustion chamber 28 for combustion.

The second portion of the oxidizer is supplied to the heat exchanger 24 of the rocket engine 14. The heat exchanger 14 may include flow conduits 46 that are milled in the wall of the nozzle 26 and/or any other heat exchange device (not shown) that can transfer the heat generated by the combustion of the rocket engine to another medium. As shown in FIGS. 1, 2 and 3, the fuel may also optionally be heated in another heat exchanger 25, thereby cooling the engine. To provide the heat exchange for both the fuel and the oxidizer, the nozzle 26 (and/or the chamber) may include cooling channels 46 for the oxidizer and cooling channels 47 for the fuel. The second portion of the oxidizer is heated by the heat exchanger 24 to transform the oxidizer from a liquid state to a super-heated gaseous state, which may be defined by a state at which the temperature of the oxidizer is well beyond its boiling point at substantially the same pressure of the oxidizer at the output of the pump 30. When the oxidizer used is oxygen, a relatively small portion of the oxidizer is transformed to a super-heated state since oxygen has a high heat of vaporization as compared to, for example, hydrogen. Thus, in order to extract useful energy from super-heated oxygen in the motor 32, the oxygen has to be significantly super-heated. Such is possible if a small portion of the oxygen is used relative to the portion that is bound for the rocket engine 14 for combustion.

The super-heated oxidizer is supplied to the motor 32 by a conduit 48. The super-heated oxidizer operates the motor 32, which may be a turbine, a reciprocating engine, or any suitable mechanical device that can convert the energy of the super-heated oxidizer to motion. The motor 32 is coupled to the oxidizer pump 30 by one or more linkages 50 to thereby operate the oxidizer pump 30. The motor 32 may also operate the fuel pump 34, which can supply high pressure fuel to the combustion chamber 28.

After transferring energy to the motor 32, the super-heated oxidizer may have a reduced pressure and temperature in comparison to its state upstream of the motor 32. However, the drop in pressure of the oxidizer may be more significant relative to a drop in temperature of the oxidizer because of the transfer of energy to the motor 32. The oxidizer may be returned either to a conduit upstream of the pump 30, as shown by a conduit 53, or to the oxidizer tank 22, as shown by the conduit 55. Alternatively, the system 20 may include a control device 54, such as a valve or any suitable control mechanism, by which all or a portion of the oxidizer can be returned to the oxidizer tank 22 and any remaining portion returned to the conduit 52. The advantage of returning oxidizer to the conduit is that it minimizes heating of the oxidizer tank; the drawback is that it increases the temperature, and hence the vapor pressure, of the oxidizer at the inlet of pump 30, increasing the difficulty of designing pump 30.

Referring to FIG. 2, which shows the system 10 and method in accordance with one embodiment of the present disclosure, the oxidizer downstream of the motor 32 is cooled prior to its return to the oxidizer supply 18. As one of ordinary skill in the art will readily appreciate, such cooling may be necessary, because the temperature of the oxidizer downstream of the motor 32 may be higher than the temperature of the oxidizer in the oxidizer supply 18. Accordingly, in the second embodiment of the present disclosure, the oxidizer downstream of the motor 32, which is in the conduit 51, and the first portion of the oxidizer in the conduit 44 are diverted to the heat exchanger 36. Heat from the oxidizer in the conduit 51 is transferred to the oxidizer in the conduit 44. Accordingly, the oxidizer downstream of the motor is cooled and condensed to a liquid form and the oxidizer upstream of the combustion chamber is heated. The cooled oxidizer in conduit 52 is then returned to the oxidizer supply 18. Similar to the first embodiment, the oxidizer may be returned upstream of the pump 30 through conduit 53 or the oxidizer tank 22 through conduit 55.

The heat exchanger 36 may not lower the temperature of the super-heated oxidizer to the original oxidizer temperature in the oxidizer supply 18. Accordingly, placing the cooled oxidizer from the heat exchanger 36 into the oxidizer supply 18 may result in warming of the oxidizer in the oxidizer supply 18. Such warming may not affect the operation of the propulsion system 12 as long as the warming does not cause boiling of the oxidizer. However, in accordance with the third embodiment of the present disclosure, such warming may be completely avoided by diverting the cooled oxidizer from downstream of the motor 32 to the rocket engine 14 for combustion.

Referring to FIG. 3, which shows the system 10 and method in accordance with one embodiment of the present disclosure, the system 10 includes a jet pump 38 in order to pressurize the cooled oxidizer that is downstream of the motor 32 and combine it with the portion of the oxidizer that is bound for combustion. A type of jet pump 38 that can be used is a venturi eductor 38, which is schematically shown in FIG. 3. As the pressurized oxidizer downstream of the oxidizer pump 30 enters the venturi 38, the pressure of the oxidizer is dropped to increase the velocity of the oxidizer. The increased velocity draws the low pressure oxidizer from the conduit 52 that is downstream of the motor 32 into the venturi eductor 38. The two oxidizer portions mix and expand as exiting the venturi eductor 38, thereby increasing the combined pressure of the mixture. Accordingly, the high-pressure low-temperature oxidizer in the conduit 44 pumps the low pressure high-temperature oxidizer downstream of the motor 32 in the conduit 52 back up to a high pressure for injection into the combustion chamber 28. Thus, the oxidizer downstream of the motor 32 is not returned to the oxidizer supply 18, but pressurized in the venturi eductor 38 and combusted in the rocket engine 14. Another example of a jet pump 38 that can be used is a steam injector.

Although not shown, the system 10 of the present disclosure can include any combination of the above-described embodiments. For example, the system 10 can include both the jet pump 38 and the heat exchanger 36. Accordingly, some of the oxidizer downstream of the motor 32 may be burned in the rocket engine 14 and some may be returned to the oxidizer supply 18. In another example, the first embodiment and the third embodiment may be combined. Accordingly, some of the oxidizer downstream of the motor 32 can be directly placed back in the oxygen supply 18 while the remaining portion is combusted in the rocket engine 14 after passing through the jet pump 38. Alternatively, the flow coupling device 40 can be positioned downstream of the heat exchanger 36 of FIG. 2 or downstream of the jet pump 38. Accordingly, all of the oxidizer from the oxidizer supply 18 can be heated in the heat exchanger 36, or mixed in the jet pump 38. Downstream of the heat exchanger 36 or the jet pump 38, the flow coupling device 40 can split the flow into two parts, which include one part for combustion and one part for cooling through the heat exchanger 24.

The system 10 and method of the present disclosure allows the use of fuels other than hydrogen in a closed pump-fed cycle as disclosed herein. Additionally, because the oxidizer downstream of the motor is at a relatively low pressure, the partial superheat cycle described herein operates with lower pressures than a conventional full-flow expander cycle. Furthermore, in the system and method of the present disclosure, the cooling of the rocket engine can be entirely performed by the oxidizer. While a particular form of the disclosure has been illustrated and described, it will be apparent that various modifications can be made without departing from the spirit and scope of the disclosure. Accordingly, it is not intended that the disclosure be limited, except as by the appended claims.

What is claimed is:

1. A propulsion system comprising:
   a rocket engine having a combustion chamber for combustion of a fuel and a first portion of an oxidizer flow, and at least one heat exchanger between the heat of combustion generated by the combustion chamber and a second portion of the oxidizer flow;
   an oxidizer supply;
   an oxidizer pump configured to fluidically couple the oxidizer supply to the combustion chamber and to the heat exchanger;
   a motor disposed downstream of the heat exchanger, an inlet of the motor being fluidically coupled to the heat exchanger, wherein the motor is configured to drive the oxidizer pump; and
   a flow coupling device configured to divide the oxidizer flow pumped from the oxidizer pump into a first flow path that passes from the flow coupling device to the combustion chamber, and a separate second flow path that passes from the flow coupling device through the heat exchanger and to the motor, the first portion of the oxidizer flow passing through the first flow path and the second portion through the second flow path.

2. The system of claim 1, wherein the flow coupling device is disposed downstream of the oxidizer pump and upstream of the rocket engine and configured to couple the pump to the combustion chamber and couple the pump to the heat exchanger.

3. The system of claim 1, wherein the flow coupling device is a passive control device configured to passively control the amount of oxidizer in the first and second portions.

4. The system of claim 1, wherein the flow coupling device is an active flow coupling device configured to actively control the amount of oxidizer in the first and second portions.

5. The system of claim 1, wherein the motor exhaust is fluidically coupled to the oxidizer supply.

6. The system of claim 5, further comprising:
   a second heat exchanger disposed downstream of the flow coupling device and upstream of the combustion chamber;
   wherein the flow coupling device is fluidically coupled to the combustion chamber through one side of the heat exchanger; and
   wherein the motor is fluidically coupled to the oxidizer supply through the second side of the heat exchanger.

7. The system of claim 1, further comprising a jet pump disposed downstream of the flow coupling device, wherein the jet pump fluidically combines the flow from the flow coupling device and the motor exhaust.

8. The system of claim 7, wherein the jet pump is a venturi eductor.

9. The system of claim 7, wherein the jet pump is a steam injector.

10. The system of claim 1, further comprising:
    a fuel supply; and
    a fuel pump configured to fluidically couple the fuel supply to the rocket engine;
    wherein the motor is configured to drive the fuel pump.

11. The system of claim 10, wherein the motor drives both the fuel pump and the oxidizer pump, and wherein the motor is driven by the second portion of the oxidizer flow, which is smaller than the first portion of the oxidizer flow.

12. The system of claim 1, wherein the motor is a turbine engine.

13. The system of claim 1, wherein the motor is a reciprocating engine.

14. The system of claim 1, wherein the pump is a centrifugal pump.

15. The system of claim 1, wherein the pump is a reciprocating piston pump.

16. The system of claim 1, wherein the pump is a scroll compressor.

17. The system of claim 1, wherein the second portion of the oxidizer flow is smaller than the first portion of the oxidizer flow.

18. The system of claim 1, wherein the second flow path passes through the motor to a location upstream of the oxidizer pump.

19. A method of driving any one of a fuel pump and an oxidizer pump in a propulsion system, the method comprising:
    pumping an oxidizer from an oxidizer supply with the oxidizer pump;
    dividing the pumped oxidizer from the oxidizer pump into first and second separate flow paths;
    passing a first portion of the oxidizer through the first flow path to the combustion chamber;
    combusting the first portion of the oxidizer in the rocket engine;
    passing a second portion of the oxidizer through the second flow path to a heat exchanger;
    transferring heat from the combustion of the first portion of the oxidizer to the second portion of the pumped oxidizer to convert the second portion of the oxidizer to a super-heated gaseous oxidizer;
    operating a motor with the super-heated gaseous oxidizer; and
    driving the oxidizer pump with the motor.

20. The method of claim 19, further comprising driving the fuel pump with the motor.

21. The method of claim 19, further comprising returning the second portion of the oxidizer to a supply of oxidizer upstream of the oxidizer pump.

22. The method of claim 19, further comprising returning the second portion of the oxidizer to an oxidizer tank.

23. The method of claim 19, further comprising controlling an amount of oxidizer in the first portion and an amount of oxidizer in the second portion with a control device.

24. The method of claim 19, further comprising transferring heat from the gaseous oxidizer exhausted from the motor to the first portion of the oxidizer prior to combustion, wherein the transferring heat heats the first portion of the oxidizer and cools the gaseous oxidizer.

25. The method of claim 19, further comprising:
   combining the first portion of the oxidizer prior to combustion with the super-heated gaseous oxidizer downstream of the motor; and
   combusting the combined mixture of the first portion of the oxidizer and the super-heated gaseous oxidizer.

26. A method of operating an oxidizer pump in a propulsion system having an oxidizer supply and a rocket engine, the method comprising:
   pumping the oxidizer with the oxidizer pump;
   dividing the pumped oxidizer from the oxidizer pump into first and second separate portions, the first portion being larger than the second portion;
   passing the first portion of the oxidizer to the rocket engine for combustion;
   heating the second portion of the oxidizer by a heat of combustion from the rocket engine, the heating converting the second portion of the oxidizer into a super-heated gaseous oxidizer;
   operating a motor with the super-heated gaseous oxidizer; and
   driving the oxidizer pump with the motor.

27. The method of claim 26, further comprising returning the second portion of the oxidizer to the oxidizer supply from the motor.

28. The method of claim 26, further comprising transferring heat from the super-heated gaseous oxidizer downstream of motor to a portion of the oxidizer for use in combustion, the transferring heating the portion of the oxidizer for use in combustion and cooling the super-heated gaseous oxidizer.

29. The method of claim 26, further comprising:
   combining the first portion of the oxidizer for use in combustion with the super-heated gaseous oxidizer downstream of the motor; and
   combusting the combined mixture of the first portion of the oxidizer for use in combustion and the super-heated gaseous oxidizer.

30. The method of claim 26, further comprising driving a fuel pump with the motor.

* * * * *